United States Patent [19]

Yamaguchi

[11] Patent Number: 5,043,894
[45] Date of Patent: Aug. 27, 1991

[54] JOLT CONTROL SYSTEM FOR DRIVE SYSTEM

[75] Inventor: Hiroshi Yamaguchi, Yokohama, Japan

[73] Assignee: Nissan Motor Co., Ltd., Yokohama, Japan

[21] Appl. No.: 375,628

[22] Filed: Jul. 5, 1989

[30] Foreign Application Priority Data

Jul. 4, 1988 [JP] Japan ................ 63-164871

[51] Int. Cl.5 ...................... B60K 41/02; B60K 41/04
[52] U.S. Cl. .................................. 364/424.1; 74/866; 74/858
[58] Field of Search ............... 364/424.1; 74/866, 867, 74/868, 869, 859, 858

[56] References Cited

U.S. PATENT DOCUMENTS

| 4,103,655 | 8/1978 | Coles | 123/481 |
|---|---|---|---|
| 4,266,447 | 5/1981 | Heess et al. | 74/866 |
| 4,324,154 | 4/1982 | Iwanaga et al. | 74/869 |
| 4,355,509 | 10/1982 | Fulkerson et al. | 60/449 |
| 4,488,456 | 12/1984 | Taga et al. | 74/866 |
| 4,502,354 | 3/1985 | Suzuki et al. | 74/866 |
| 4,680,988 | 7/1987 | Mori | 74/866 |
| 4,691,285 | 9/1987 | Takeda | 74/866 |
| 4,724,723 | 2/1988 | Lockhart et al. | 74/854 |
| 4,798,105 | 1/1989 | Takase et al. | 74/866 |
| 4,811,223 | 3/1989 | Iwatsuki et al. | 74/866 |
| 4,969,098 | 11/1990 | Leising et al. | 74/866 |

FOREIGN PATENT DOCUMENTS 62-17333 7/1987 Japan .
2151727 7/1985 United Kingdom .

OTHER PUBLICATIONS

"Nissan Full-Range Automatic Transmission RE4R-01A Type, Service Manual, (A261C07)", Mar., 1987.

Primary Examiner—Parshotam S. Lall
Assistant Examiner—Gary D. Yacura
Attorney, Agent, or Firm—Foley & Lardner

[57] ABSTRACT

In a drive system including a torque split type multi-cylinder internal combustion engine and an automatic transmission, the magnitude of line pressure for shifting operation is varied in accordance with the number of cylinders disabled by fuel-cut during the shifting operation.

7 Claims, 7 Drawing Sheets

NON - SHIFTING

DURING 1→2 UPSHIFT 5,043,894

JOLT CONTROL SYSTEM FOR DRIVE SYSTEM

BACKGROUND OF THE INVENTION

The present invention relates to a jolt control system for a drive system including a prime mover and an automatic transmission.

An automatic transmission is shiftable between two gear positions by hydraulically activating friction elements selectively. The quality of a 1-2 upshift in the automatic transmission may be evaluated by inspecting a waveform of the transmission output torque. FIG. 10 shows in the fully drawn curve a a waveform of transmission torque which induces a substantial shift shock. The magnitude of the shift shock is determined on how much extra capacity of the shifting friction element exists in comparison with the output torque of the prime mover. If this capacity is excessively small, the friction element slips for a prolonged time, causing deterioration in its operating life and, in worst case, becomes baked. Hence, in the usual case, the capacity of the friction element must be set larger than required.

For reducing the shift shock, the capacity of the friction element is reduced by decreasing the servo activating hydraulic pressure supplied thereto during the shift operation. In this case, however, the time required for the shift operation becomes long as will be apparent from a waveform illustrated by the one-dot chain curve b in FIG. 10.

Alternatively, the output torque of the prime mover may be reduced. However, even with this measure, there still occurs a peak torque as illustrated by the dotted curve c in FIG. 10. The engine output torque control mentioned above, however, is not conducted when the engine has not been warmed up or operates at low speeds since were it conducted then the engine might stall. If the setting is made such that the level of servo activating hydraulic pressure supplied to the shifting friction element is sufficiently low to meet the reduced engine output torque, the capacity of the friction element becomes short when the engine output torque does not drop owing to the above-mentioned reasons. This causes the friction element to slip for a prolonged time, resulting in deterioration in the operating life of the friction element and, in worst case, baking. Besides, the quality of shift shock occurring when the engine output torque control is not conducted at low engine temperature or at low speed is different from that when the engine output torque control is conducted under those conditions. This gives a discomfort to the vehicle occupant.

Tokkai Sho 62-173337 (JP-A) teaches reducing the level of servo activating hydraulic fluid pressure supplied to the shifting friction element (in order to modulate the capacity of the shifting friction element) only when the engine output torque reduction control is to be conducted. In FIG. 10, the two-dot chain curve d shows a waveform of the engine output torque due to a jolt control system according to this teaching.

An object of the present invention is to provide a jolt control system wherein the capacity of the shifting friction element is varied to meet the amount of a reduction in the engine output torque owing to the engine output torque control conducted during a shifting operation in the automatic transmission.

SUMMARY OF THE INVENTION

According to one aspect of the present invention, there is provided a jolt control system for a drive system including a prime mover with a throttle which opens in degrees and an automatic transmission, the automatic transmission including a friction element that is hydraulically activated to be engaged at a controlled rate during a shifting operation between two gear positions, the jolt control system comprising; means for urging the prime mover to effect a reduction in output torque thereof during the shifting operation when a predetermined condition is met, and means for varying the magnitude of a servo activating hydraulic fluid pressure to be supplied to the friction element during the shifting operation in accordance with a first predetermined pattern when said predetermined condition fails to be met, but in a second predetermined pattern when said predetermined condition is met, said second predetermined pattern being different from said first predetermined pattern.

According to another aspect of the present invention, there is provided a jolt control system for a drive system including a prime mover and an automatic transmission, the automatic transmission including a friction element that is hydraulically activated to be engaged at a controlled rate during a shifting operation between two gear positions, the jolt control system comprising, means for urging the prime mover to effect a reduction in output torque thereof during the shifting operation, means for determining degree of said reduction in output torque during the shifting operation, and means for varying torque transmitting capacity of the friction element in accordance with said degree determined.

According to still another aspect of the present invention, there is provided a drive system with; a multi-cylinder internal combustion engine of the torque split with a throttle which opens in degrees, an automatic transmission, the automatic transmission including a friction element that is hydraulically activated to be engaged at a controlled rate during a shifting operation between two gear positions, means for disabling a portion of the cylinders of said multi-cylinder internal combustion engine to urge said engine to effect a reduction in output torque thereof during the shifting operation, means for varying the magnitude of a servo activating hydraulic fluid pressure to be supplied to the friction element during the shifting operation in accordance with a first predetermined pattern when said predetermined condition fails to be met, but in a second predetermined pattern being different from said first predetermined pattern.

DETAILED DESCRIPTION OF THE INVENTION

Hereinafter, the invention will be described in detail with reference to the drawings.

Figure 1:
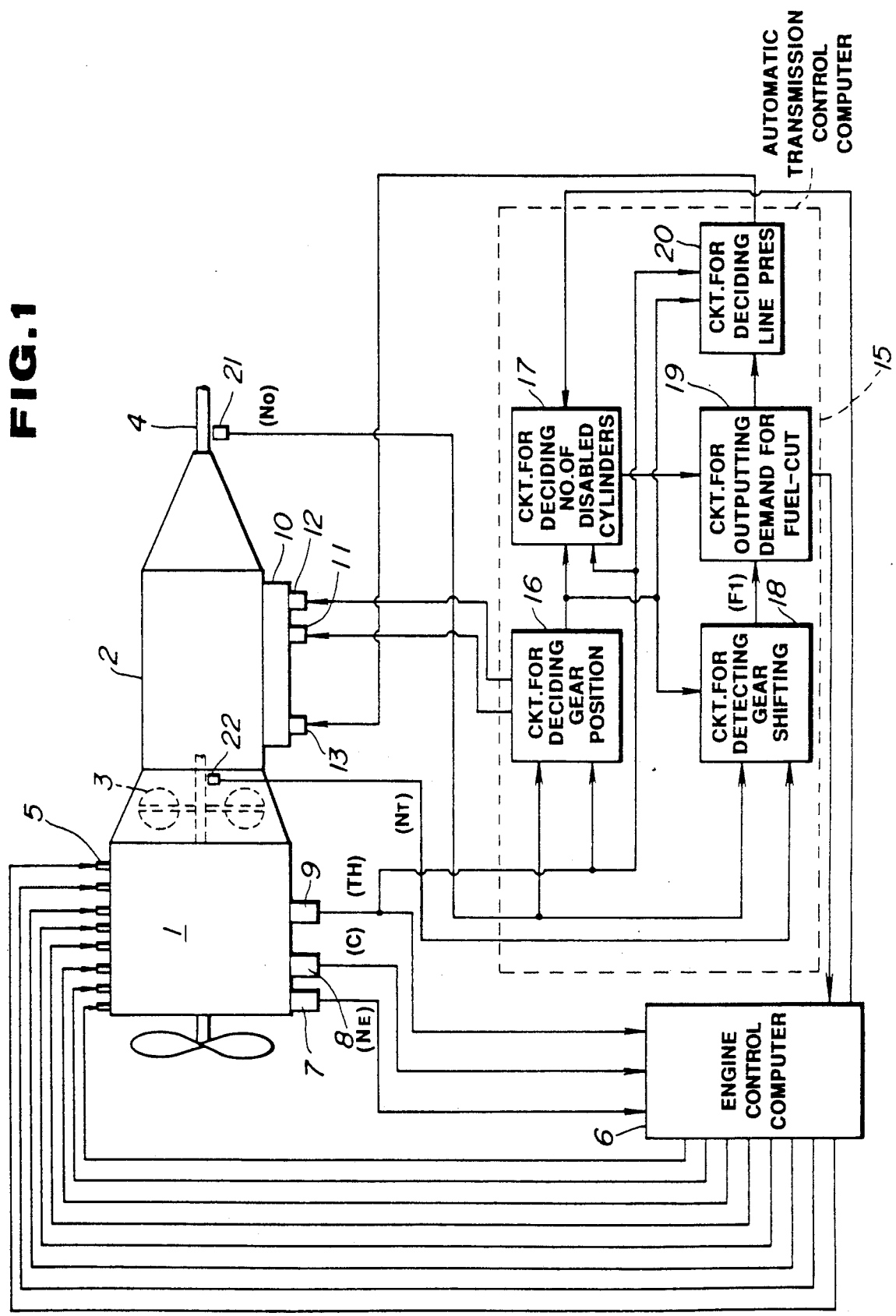
FIG. 1 is a block diagram of a drive system with a jolt control system according to the present invention.

FIG. 1 shows one embodiment of a jolt control system according to the invention, in which 1 denotes an engine serving as a prime mover and 2 denotes an automatic transmission. The power of the engine 1 is delivered through a torque converter 3 to the automatic transmission 2, which allows delivery of the power to a transmission output shaft 4 in a manner to drive the driving wheels of the vehicle in accordance with a gear ratio provided by the gear position established in the automatic transmission.

The engine 1 is an light-cylinder engine having eight fuel injection valves 5 for eight cylinders, respectively. These fuel injection valves 5 are opened or closed by an engine control computer 6. The computer 6 calculates and determines the amount of fuel to be injected in response to an engine speed indicative signal sent from an engine speed sensor 7 which detects the engine crankshaft revolution speed $N_E$, an engine coolant temperature indicative signal from an engine coolant temperature sensor 8 which detects a temperature C of an engine coolant, and a throttle opening degree indiative signal from a throttle sensor 9 which detects a throttle opening degree TH representative of an engine load. Then, the computer 6 operates to individually open each fuel injection valve 5 for a duration of time which is variable with variations in the engine speed $N_E$ for allowing fuel to be injected to the corresponding cylinder of the engine 1. Yet, when the output torque of the engine 1 is reduced while the automatic transmission 2 is shifting in gear position, a fuel supply to some cylinder or cylinders is cut to disable the same.

The automatic transmission 2 has a control valve assembly 10. The control valve assembly 10 has a first shift solenoid 11, a second shift solenoid 12, and a line pressure solenoid 13. The shift solenoids 11 and 12 are rendered ON (energized) and/or OFF (deenergized) or vice versa in a manner as tabuleted in Table 1 as follows:

TABLE 1

|  | First Solenoid 11 | Second Solenoid 12 |
| --- | --- | --- |
| First Speed | ON | ON |
| Second Speed | OFF | ON |
| Third Speed | OFF | OFF |
| Fourth Speed | ON | OFF |

In this case, the servo activating hydraulic pressure for respective friction elements is a line pressure which is generated as a result of pressure regulation by the line pressure solenoid 13 that is duty controlled. During a shifting operation, the capacity of a friction element to be hydraulically activated is controlled by temporarily modulating the line pressure.

The on-off control of the solenoids 11, 12 and the duty control of the line pressure solenoid 13 are executed by an automatic transmission control computer 15. The computer 15 performs various functions which may be illustrated by circuits or stages 16, 17, 18, 19 and 20 for deciding gear position, for deciding number of disabled cylinders by fuel-cut, for detecting gear shifting, for outputting demand for fuel-cut, and for deciding line pressure.

The automatic transmission mentioned above is of the RE4R01A type described in "NISSAN FULL-RANGE AUTOMATIC TRANSMISSION RE4R-01A TYPE, SERVICE MANUAL, (A261C07)" issued on March, 1987 by NISSAN MOTOR COMPANY LIMITED. The automatic transmission of the above mentioned type is also disclosed in the before mentioned U.S. Pat. No. 4,680,992 (Hayasaki et al.) which is hereby incorporated in its entirety by reference.

In order to make clear the functions attributed to the circuits or stages shown in FIG. 1, the flowcharts shown in FIGS. 2, 4, 6 and 7 of programs are explained although these programs are stored in a read only memory (ROM) of the automatic transmission control computer 15 and executed under the control of a central processing unit (CPU).

At the circuit or stage 16, a desired shift in gear position is determined by looking up a predetermined shift pattern table using the throttle opening degree indicative signal TH (engine load) and the transmission output shaft revolution speed indicative signal $N_O$ (vehicle speed) and controls the ON/OFF state of the shift solenoids 11, 12 to establish the gear position desired.

Figure 2:
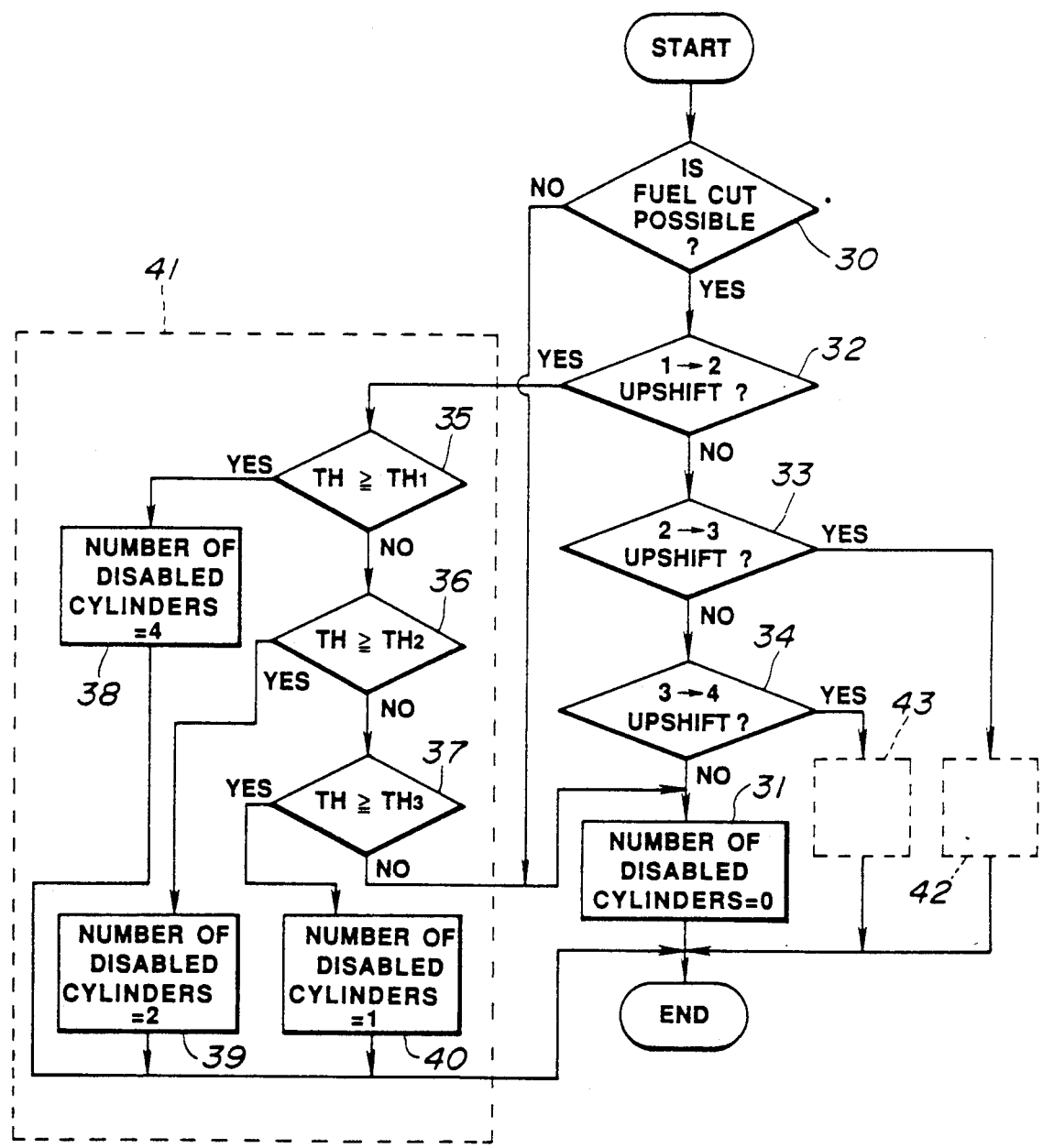
FIG. 2 is a flowchart of a program for determining the number of cylinders to be disabled by a fuel-cut operation.

Referring to the flowchart shown in FIG. 2, the function of the circuit or stage 17 is explained. Supplied to this stage 17 is the signal indicative of the desired shift determined at the circuit 16, the throttle opening degree indicative signal TH from the sensor 9, and a fuel-cut enable signal from the engine control computer 6. In FIG. 2, at a step 30, it is determined whether the fuel-cut operation is possible or not by checking whether or not the engine speed $N_E$ is greater than or equal to a predetermined value, a coolant temperature C is higher than or equal to a predetermined value, and there is issued the fuel-cut enable signal from the engine control computer 6. If it is determined that the fuel-cut operation is not possible, the number of cylinders to be disabled (viz., disabled cylinder) is set to zero at a step 31. If possible, the program proceeds to steps 32 to 34 to determine which of different types of shifts the desired shift determined at the stage 16 belongs to. If the desired shift determined at the stage 16 is a downshift or no shift is required, the program proceeds through all of the steps 32, 33 and 34 to the step 31 where the number of diabled cylinders is set to 0 (zero) since this is where the engine output reduction control is not required.

Figure 3:
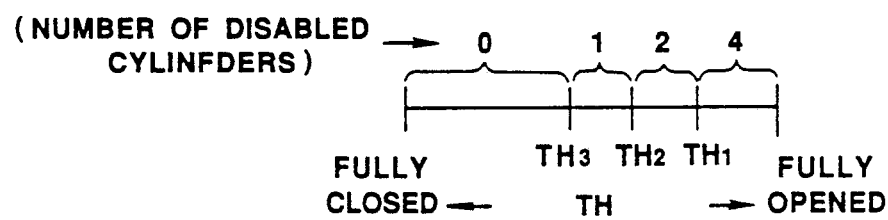
FIG. 3 is a chart illustrating the number of disabled cylinders versus variation in throttle disabled cylinders versus variation in throttle

If the desired shift determined is found to be a 1-2 upshift at the step 32, it is determined at steps 35 to 37 which of four regions the throttle opening degree TH falls in. As shown in FIG. 3, these four regions correspond to different numbers of disabled cylinders, respectively, and thus are used for evaluating the number of disabled cylinders for effective reduction of the upshift shock during the 1-2 shift. If $TH \geq TH_1$, the number of disabled cylinders is set to 4 at a step 38 to allow the fuel-cut to four cylinders. In the condition of $TH_1 > TH \geqq TH_2$, the number of disabled cylinders is set to 2 at a step 39 to allow the fuel-cut to two cylinders. If $TH_2 > TH \geqq TH_3$, the number of disabled cylinders is set to 1 at a step 40 to allow the fuel-out to one cylinder. If $TH < TH_3$, the number of disabled cylinders is set to 0 (zero) at the step 31 to prohibit fuel-cut operation.

If the desired shift determined at the stage 16 is found to be a 2-3 upshift at the step 32 or a 3-4 upshift at the step 34, a similar control to the control enclosed by a block 41 is executed at a step 42 or 43, although $TH_1$, $TH_2$ and $TH_3$ are set to different values. As is now be appreciated, the different numbers of disabled cylinders are set for different type of desired shift in order to effectively reduce the shift shock.

Figure 5:
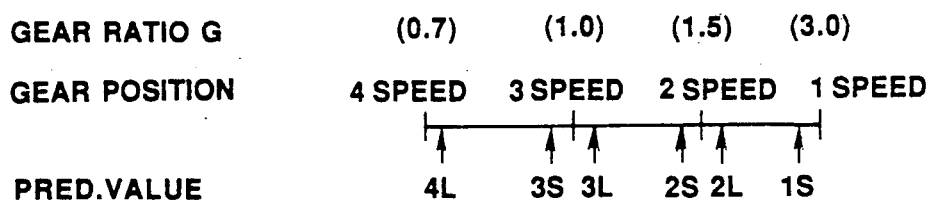
FIG. 5 is a chart illustrating the number of disabled cylinders versus variation in throttle opening degree (TH)
Figure 4:
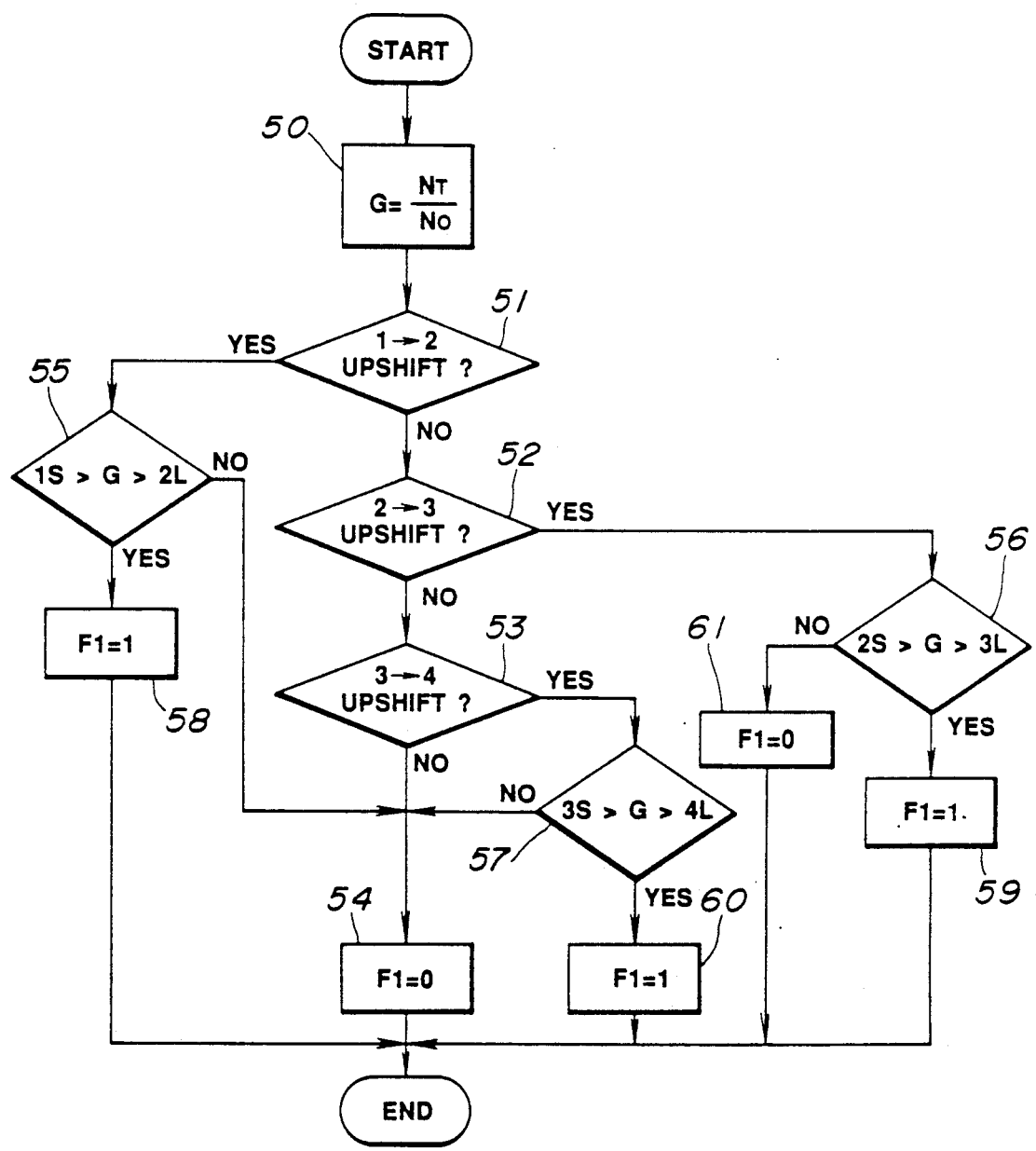
FIG. 4 is a flowchart of a program for detecting gear position.

Referring to FIG. 4, the function to detect gear shifting performed at the stage 18 is explained. Supplied to this stage 18 are the transmission input shaft revolution speed $N_T$, the transmission output shaft revolution speed $N_O$ and the desired shift determined at the stage 16. In FIG. 4, at a step 50, a ratio $N_T/N_O$ (viz. a gear ratio G) is calculated. Then, the type which the desired shift determined at the stage 16 belongs to is evaluated at steps 51 to 53. If the desired shift determined at the stage 16 is found to be a downshift or no shift is required, it is unnecessary to reduce the engine output during the shifting operation. Thus, a flag F1 indicating that the shifting operation is under progress is reset to 0 (zero). If the desired shift is any one of a 1-2 upshift, a 2-3 upshift, or a 3-4 upshift, the gear ratio G is checked at the corresponding one of steps 55, 56, and 57 to determine whether or not the upshift operation progresses. Reference is made to FIG. 5 in this regard. If it is determined that the upshift operation is under progress, the flag F1 is set to 1 at the corresponding step 58 or 59 or 60. If it is found that the upshift operation is not yet initiated or completed, the flag F1 is reset to zero at the corresponding step 54 or 61.

Figure 6:
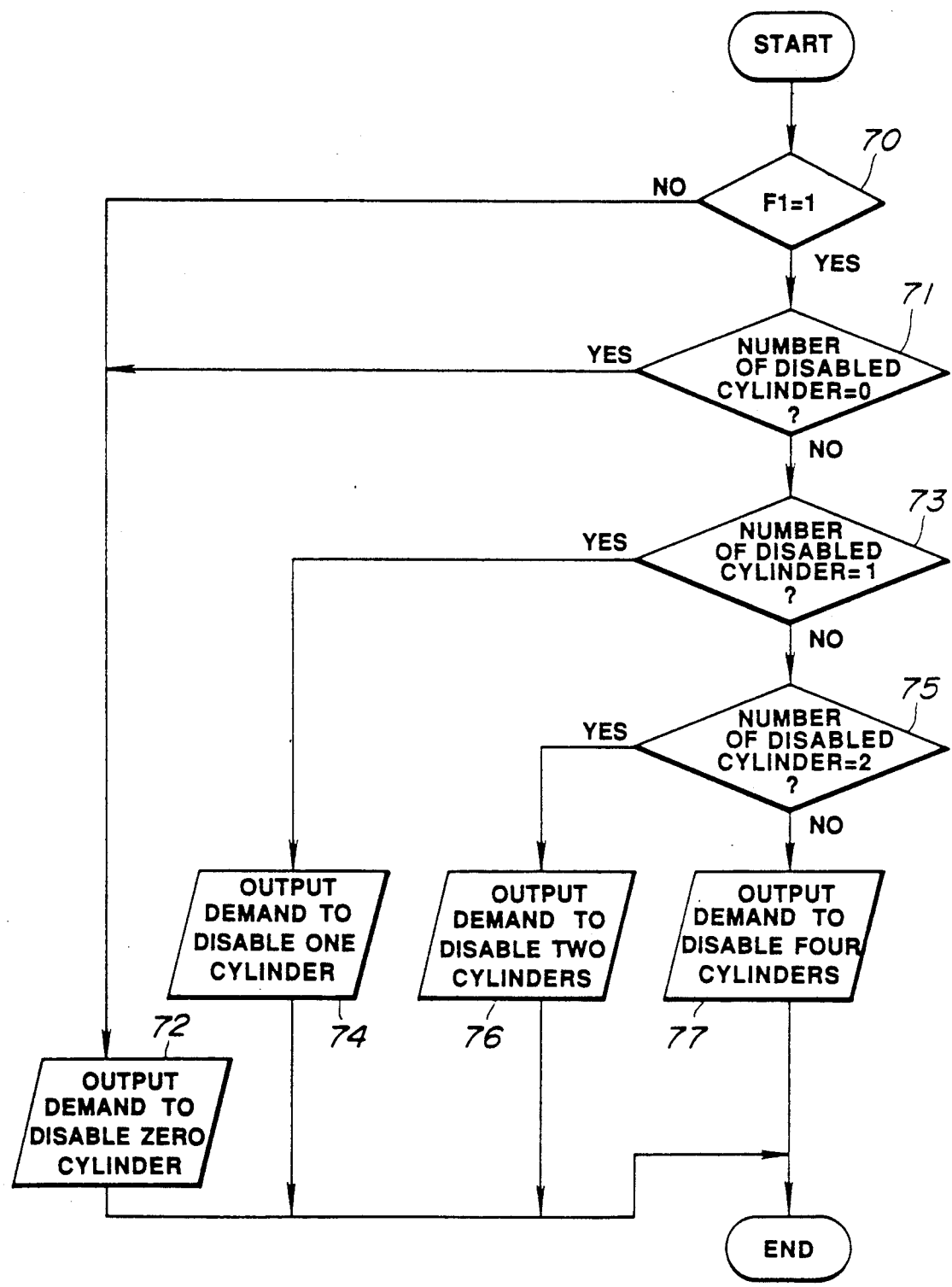
FIG. 6 is a flowchart of a program for outputting demand for fuel-cut.

Referring to FIG. 6, the function to output demand for fuel-cut operation performed at the circuit or stage 19 is explained. The demand for fuel-cut is fed to the engine control computer 6 to cut fuel supply to some portion of the cylinders of the engine 1 to urge the engine 1 to reduce output torque thereof. Supplied to the stage 19 are the signal indicative of the state of the flag F1 determined at the stage 18 (see flowchart shown in FIG. 4) and the signal indicative of the number of disabled cylinders set at the stage 17 (see flowchart shown in FIG. 2). In FIG. 6, at a step 70, it is determined whether or not F1-1, that is, whether the upshift is under progress or not. This is to determine when the engine 1 is urged to reduce the output torque thereof for the purpose of reducing the shift shock. If it is determined that the flag F1 is not set, the program proceeds to a step 72 where a demand to disable zero cylinder is outputted, that is, the fuel supply to all of the cylinders is maintained (no fuel-cut). If the flag F1 is found to be set at the step 70, and if the number of disabled cylinders is zero at a step 71, the program proceeds to the step 72 where the demand to disable zero cylinders is outputted to the engine control computer 6. If the number of disabled cylinders is found to be 1 at a step 73, there is outputted demand to disable one cylinder at a step 74. If the number of disabled cylinders is found to be 2 at a step 75, there is outputted demand to disable two cylinders at a step 76. If at the step 75 it is determined that the number of disabled cylinders is not 2, there is outputted demand to disable four cylinders at a step 77. In response to the demand outputted, one or some of the fuel injection valves 5 are closed to disable the number of cylinders demanded under the control of the engine control computer 6 during the upshift operation.

Figure 7:
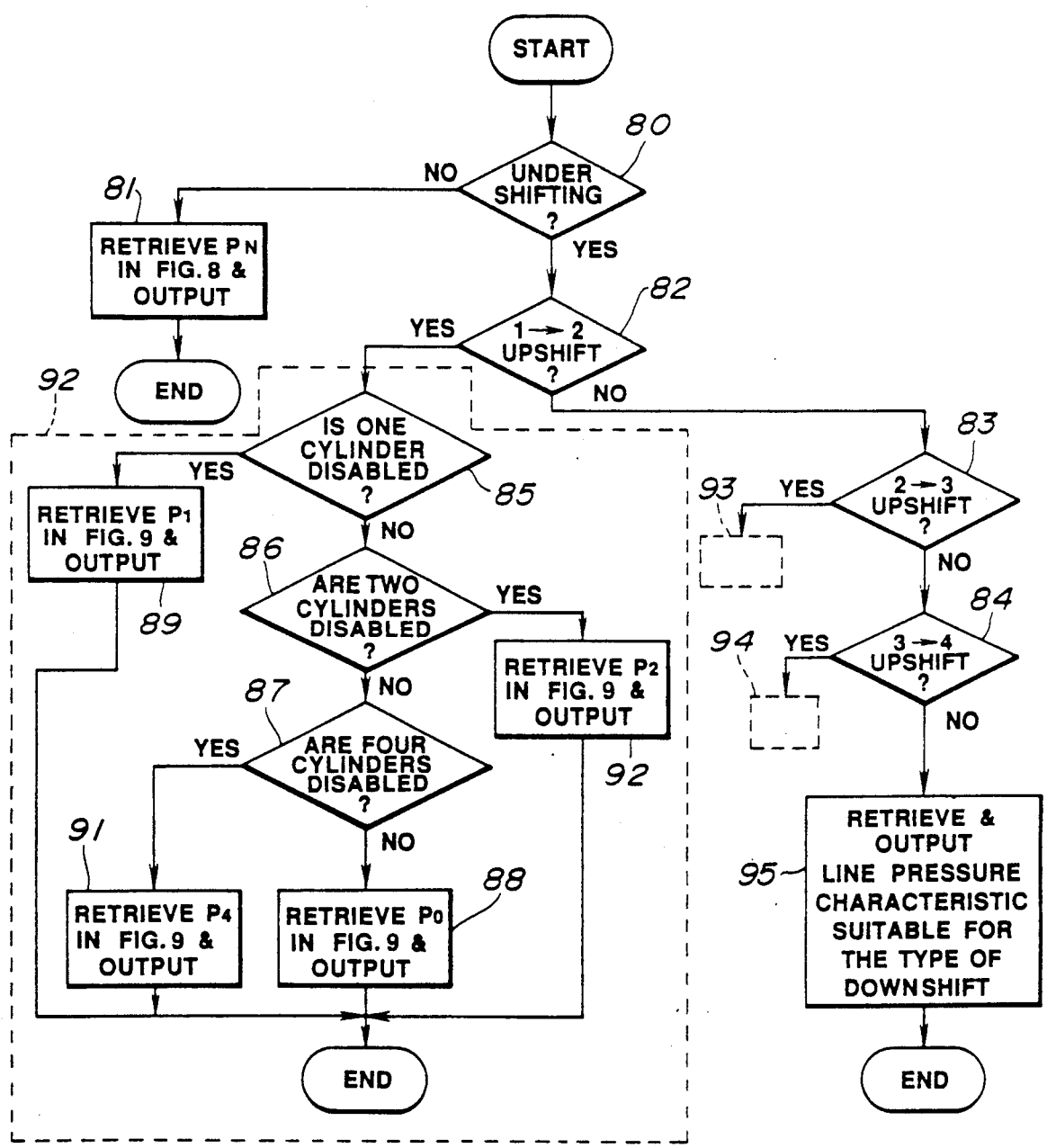
FIG. 7 is a flowchart of a program for deciding the line pressure in a magnitude in accordance with the amount by which the prime mover drops the output torque thereof during a shifting operation.
Figure 8:
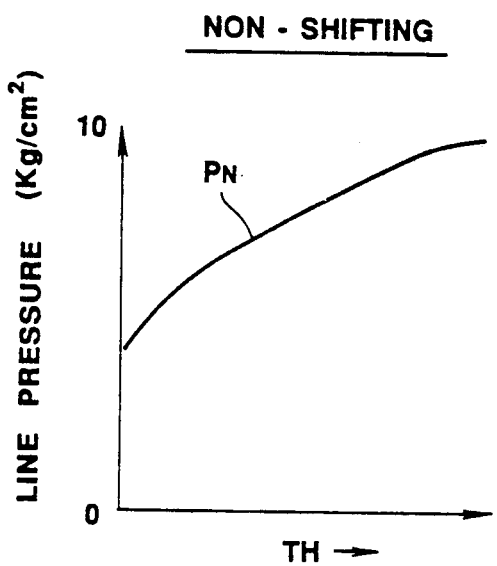
FIG. 8 is a graph showing line pressure characteristic for non-shifting.
Figure 9:
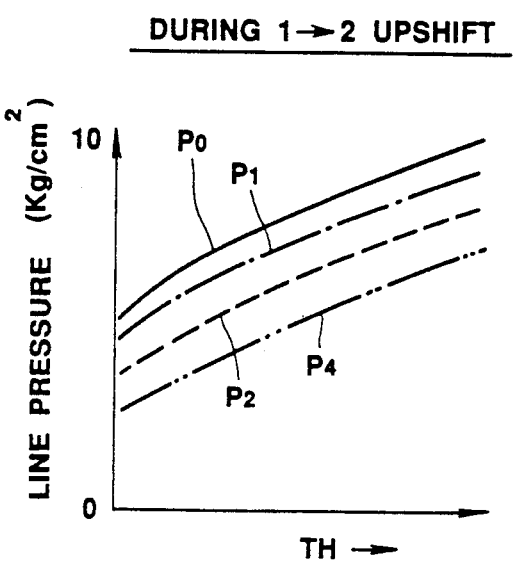
FIG. 9 is a graph showing different line pressure characteristics for different amounts by which the prime mover drops the output torque thereof during a 1-2 upshift operation.
Figure 10:
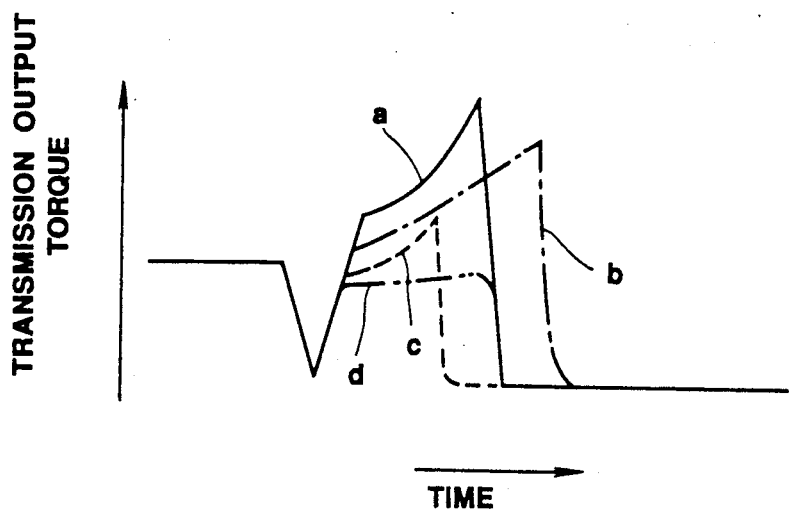
FIG. 10 shows different waveforms of engine output torque discussed before.

Referring to FIG. 7, the function which decides the magnitude or level of the line pressure (servo activating hydraulic fluid pressure) performed at the stage or circuit 20 is explained. At the stage 20, the driving duty of the line pressure solenoid 13 is determined. Supplied to the stage 20 are the desired shift indicative signals from the stage 16, the throttle opening degree indicative signal TH and the signal indicative of the number of disabled cylinders used in the stage 19. In FIG. 7, at a step 80, it is determined whether the automatic transmission 2 is under upshifting or not by checking the state of the gear ratio G. If the transmission is not under shifting, the program proceeds to a step 81 where a table look-up operation of the characteristic $P_N$ shown in FIG. 8 is conducted using the throttle opening degree TH to retrieve a line pressure data in terms of duty factor to be supplied to the line pressure solenoid 13. If it is determined at the step 80 which one of any of the three types of upshifting operations, namely a 1-2 upshift, a 2-3 upshift and a 3-4 upshift, is under progress, the program proceeds toward steps 82, 83, and 84 where the type of the shifting now under progress is checked. If it is determined at the step 82 that the 1-2 upshift is under progress, the program proceeds toward the steps 85, 86 and 87 where the number of disabled cylinders is checked. If the number of disabled cylinders is 0 (zero), the program proceeds down to a step 88 where a table look-up operation of the line pressure characteristic $P_O$ shown in FIG. 9 is conducted using the throttle opening degree TH to retrieve an appropriate line pressure data in terms of a duty factor to the line pressure solenoid 13. If it is determined at the step 85 that the number of disabled cylinders is 1, the program proceeds to a step 89 where a table look-up operation of the line pressure characteristic $P_1$ shown in FIG. 9 is performed using the throttle opening degree TH to retrieve an appropriate data in terms of duty factor to the line pressure solenoid 13. If it is determined that the number of disabled cylinders is 2 at the step 86 or 4 at the step 87, a table look-up operation of the corresponding line pressure characteristic $P_2$ or $P_4$ shown in FIG. 9 is performed using the throttle opening degree TH to retrieve an appropriate data in terms of duty factor to the line pressure solenoid 13. Thus, the line pressure solenoid 13 is operated on the duty factor determined at the steps 81, 88, 89, 91, or 92 to bring the magnitude of the line pressure into agreement with the corresponding one of the line pressure characteristics.

As will now be understood from FIG. 9, with the same throttle opening degree TH, the magnitude of the line pressure varies in accordance with the number of disabled cylinders. This means that the magnitude of the capacity of the friction element activated by this line pressure varies according to the reduction of the engine output torque which differs according to the number of disabled cylinders. Therefore, it is now possible to reduce the shift shock during the 1-2 upshift to a satisfactory low level.

Referring back to FIG. 7, if, at steps 83 or 84, it is determined that the 2-3 upshift or 3-4 upshift is under progress, the program proceeds to execute processes enclosed by a block 93 or 94. These processes are substantially the same as those enclosed by a block 92 although different sets of line pressure characteristics are used.

If the inquiry at the step 84 is "NO", this means that the shift under progress is a downshift. Then, the program proceeds to a block 95, and a table look-up operation of an appropriate one out of the set of line pressure characteristics is conducted using the throttle opening degree TH to retrieve an appropriate line pressure data in terms of duty factor to the line pressure solenoid 13. Thus, the line pressure supplied to the shifting friction element as the servo activating hydraulic pressure is suitably adjusted to the type of the downshift under progress.

What is claimed is:

1. A jolt control system for a drive system including a prime mover with a throttle which opens in degrees and an automatic transmission, the automatic transmission including a friction element that is hydraulically activated to be engaged at a controlled rate during a shifting operation between two gear positions, the jolt control system comprising:
   means for urging the prime mover to effect a reduction in output torque thereof during the shifting operation when a predetermined condition is met; and
   means for varying the magnitude of a servo activating hydraulic fluid pressure to be supplied to the friction element during the shifting operation in accordance with a first predetermined pattern when said predetermined condition fails to be met, but in a second predetermined pattern when said predetermined condition is met, said second predetermined pattern being different from said first predetermined pattern.

2. A jolt control system for a drive system including a prime mover and an automatic transmission, the automatic transmission including a friction element that is hydraulically activated to be engaged at a controlled rate during a shifting operation between two gear positions, the jolt control system comprising:
   means for urging the prime mover to effect a reduction in output torque thereof during the shifting operation;
   means for determining degree of said reduction in output torque of said prime mover to occur during the shifting operation; and
   means for varying torque transmitting capacity of the friction element in accordance with said degree determined.

3. A jolt control system as claimed in claim 2, wherein said urging means include sensor means for detecting a load on the prime mover and generating a load indicative signal indicative of the load detected; and means for determining degree of said reduction in output torque of the prime mover in response to said load indicative signal.

4. A jolt control system as claimed in claim 3, wherein said means for varying torque transmitting capacity include means for storing a set of retrievable data representing a predetermined line pressure characteristic versus said load indicative signal, and different sets of retrievable data representing different line pressure characteristics versus said load indicative signal; and means for determining the magnitude of line pressure during the shifting operation based on said different sets of retrievable data in response to said load indicative signal and the type of shift of the shifting operation.

5. A jolt control method for a drive system including a prime mover with a throttle which opens in degrees and an automatic transmission, the automatic transmission including a friction element that is hydraulically activated to be engaged at a controlled rate during a shifting operation between two gear positions, the jolt control method comprising the steps of:
   urging the prime mover to effect a reduction in output torque thereof during the shifting operation when a predetermined condition is met; and
   varying the magnitude of a servo activating hydraulic fluid pressure to be supplied to the friction element during the shifting operation in accordance with a first predetermined pattern when said predetermined condition fails to be met, but in a second predetermined pattern when said predetermined condition is met, said second predetermined pattern being different from said first predetermined pattern.

6. A jolt control method for a drive system including a prime mover and an automatic transmission, the automatic transmission including a friction element that is hydraulically activated to be engaged at a controlled rate during a shifting operation between two gear positions, the jolt control method comprising the steps of:
   urging the prime mover to effect a reduction in output torque thereof during the shifting operation;
   determining degree of said reduction in output torque of said prime mover to occur during the shifting operation; and
   varying torque transmitting capacity of the friction element in accordance with said degree determined.

7. In a drive system:
   a multi-cylinder internal combustion engine of the torque split with a throttle which opens in degrees;
   an automatic transmission, the automatic transmission including a friction element that is hydraulically activated to be engaged at a controlled rate during a shifting operation between two gear positions;
   means for disabling a portion of the cylinders of said multi-cylinder internal combustion engine to urge said engine to effect a reduction in output torque thereof during the shifting operation when a predetermined condition is met; and
   means for varying the magnitude of a servo activating hydraulic fluid pressure to be supplied to the friction element during the shifting operation in accordance with a first predetermined pattern when said predetermined condition fails to be met, but in a second predetermined pattern when said predetermined condition is met, said second predetermined pattern being different from said first predetermined pattern.

* * * * *